United States Patent
Alpert et al.

(10) Patent No.: US 9,098,669 B1
(45) Date of Patent: Aug. 4, 2015

(54) BOUNDARY LATCH AND LOGIC PLACEMENT TO SATISFY TIMING CONSTRAINTS

(71) Applicant: International Business Machines Corporation, Armonk, NY (US)

(72) Inventors: Charles J. Alpert, Austin, TX (US); Mark D. Aubel, Essex Junction, VT (US); Gregory F. Ford, San Jose, CA (US); Zhuo Li, Cedar Park, TX (US); Chin Ngai Sze, Austin, TX (US); Paul G. Villarrubia, Austin, TX (US); Natarajan Viswanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/152,847

(22) Filed: Jan. 10, 2014

(51) Int. Cl.
G06F 17/50 (2006.01)

(52) U.S. Cl.
CPC ........ *G06F 17/5072* (2013.01); *G06F 2217/06* (2013.01); *G06F 2217/08* (2013.01); *G06F 2217/84* (2013.01)

(58) Field of Classification Search
CPC .............. G06F 17/505; G06F 17/5072; G06F 17/5068; G06F 17/5077; G06F 17/5081
USPC .................................. 716/119, 122, 124, 134
See application file for complete search history.

(56) References Cited

U.S. PATENT DOCUMENTS

| | | | |
|---|---|---|---|
| 7,549,137 B2 | 6/2009 | Alpert et al. | |
| 8,271,920 B2 | 9/2012 | Cho et al. | |
| 8,302,056 B2 | 10/2012 | Gaugler et al. | |
| 8,495,552 B1 | 7/2013 | Cho et al. | |
| 2002/0066065 A1* | 5/2002 | Baumgartner et al. | 716/6 |
| 2008/0072108 A1* | 3/2008 | Ito | 714/700 |
| 2008/0072190 A1* | 3/2008 | Jain et al. | 716/5 |
| 2008/0127018 A1 | 5/2008 | Alpert et al. | |
| 2008/0216038 A1 | 9/2008 | Bose | |
| 2011/0289468 A1* | 11/2011 | Keinert et al. | 716/124 |
| 2013/0326455 A1* | 12/2013 | Alpert et al. | 716/122 |

OTHER PUBLICATIONS

Malik, Sharad, et al., "Retiming and Resynthesis: Optimizing Sequential Networks with Combinational Techniques", IEEE Transactions on Computer-aided Design of Integrated Circuits and Systems, v.10, n. 1, pp. 74-84.

(Continued)

*Primary Examiner* — Vuthe Siek (74) *Attorney, Agent, or Firm* — Steven L. Bennett; Jack V. Musgrove (57) ABSTRACT

Boundary timing in the design of an integrated circuit is facilitated by designating a subset of boundary latches in the circuit, and applying placement constraints to the boundary latches. Global placement is performed while maintaining the boundary latch placement constraints, and a timing driven placement is performed after implementing timing assertions. Boundary latches are designated using a depth-first search to identify the first latches along interconnection paths with the PI/PO, and filtering out ineligible latches according to designer rules. A latch can be filtered out if it is in a large cluster of latches driven by a primary input or driving a primary output, if it drives too many POs, or is a feed-through latch. Constraints include movebounds, preplacement, or attractive forces between boundary latches and other boundary fixed objects, i.e., a fixed gate or a PI/PO.

24 Claims, 6 Drawing Sheets

(56) References Cited

OTHER PUBLICATIONS

Pan, David Z., et al., "Timing Driven Placement", Ch. 21 in "Handbook of Algorithms for VLSI Physical Automation" (edited by Charles J. Alpert, Dinesh P. Mehta, and Sachin S. Sapatnekar), CRC Press (2007).

* cited by examiner

BOUNDARY LATCH AND LOGIC PLACEMENT TO SATISFY TIMING CONSTRAINTS

BACKGROUND OF THE INVENTION

1. Field of the Invention

The present invention generally relates to integrated circuit design, and more particularly to a method of placing logic in a design as part of a physical synthesis process.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Figure 1:
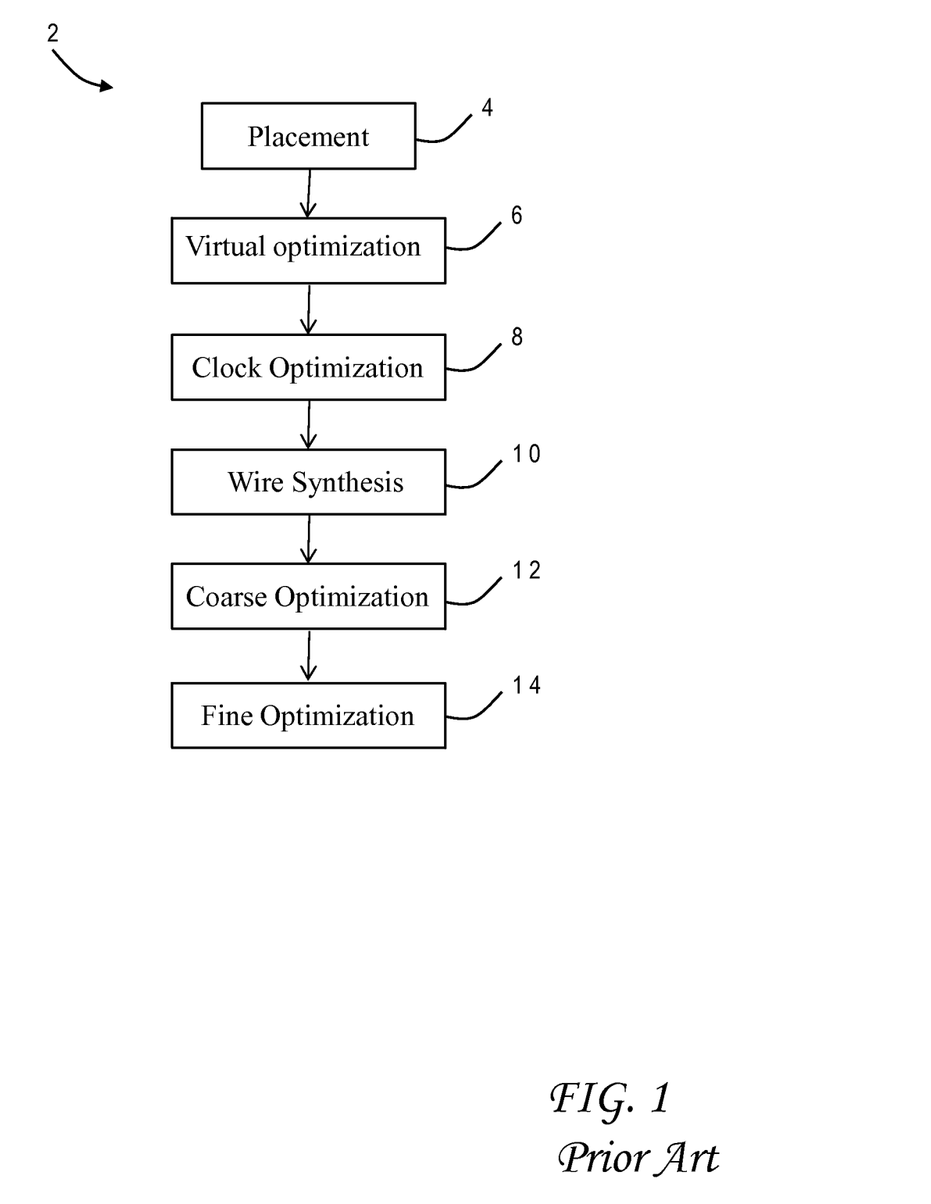
FIG. 1 is a chart illustrating the logical flow for a conventional physical synthesis process.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. FIG. 1 shows the logical flow for a general physical synthesis process 2. The process begins with logic (cell) placement 4 for moveable objects in the circuit netlist. Placement may be carried out according to a variety of methods, one example being an analytical placer which optimally solves a relaxed placement formulation, such as minimizing total quadratic wire length for the interconnections between the placed cells. The timing of the circuit (dataflow) is then analyzed and adjusted in a virtual optimization 6 which eliminates most timing path violations. Clock networks for clock sinks of the circuit such as latches are then optimized 8, and wire synthesis 10 is performed to provide routing (interconnections) between the cells according to the netlist. The process continues with a coarse optimization 12 and a fine optimization 14 which refine the layout using for example buffer insertion, gate sizing, min-cut placement or other heuristic techniques. After any of these steps the process may use various constraints or design parameters to determine whether further placement or optimization is desired, and any step(s) may be repeated.

Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs are ever larger and more gates need to be placed. There are also more chances for bad placements due to limited area resources and boundary timing constraints (required arrival times or slack) that are applied to the primary inputs or outputs of a circuit or sub-circuit.

SUMMARY OF THE INVENTION

The present invention is generally directed to a method of laying out a circuit design for an integrated circuit by receiving a description of the circuit design which includes a plurality of latches interconnected with at least one primary input and at least one primary output, designating a subset of latches as boundary latches, applying one or more placement constraints to the boundary latches, performing global placement on the circuit design using wirelength optimization while maintaining the placement constraints applied to the boundary latches, implementing timing assertions for the circuit design, and running a timing driven placement on the circuit design subject to the timing assertions. The boundary latches can be designated by conducting a depth-first search of the circuit design description to identify a plurality of candidate latches that are first found along interconnection paths from the primary input or to the primary output, and filtering out any ineligible latches from the plurality of candidate latches according to designer rules. For example, a candidate latch can be filtered out if (i) it is part of a cluster of latches that are driven by the primary input or drive the primary output wherein the cluster has a number of latches that exceeds a predetermined threshold, (ii) it is a feedthrough latch (connected to both primary input and primary output), or (iii) it drives a number of primary outputs that exceed a predetermined threshold. The constraints may include movebounds or region constraints for a boundary latch, preplacement of a boundary latch, or application of an attractive force between a boundary latch and a boundary fixed object, i.e., a fixed gate or a primary input/output.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Faster performance and predictability of responses are elements of interest in circuit designs. As process technology scales to the deep and ultra-deep submicron regimes, meeting tight timing constraints is becoming increasingly important to the performance and reliability of IC chips and systems. The issue of design closure with early or incomplete boundary timing constraints is an unsolved problem for current design processes. Designers are generally given difficult boundary timing constraints which drive all of the latches and boundary logic towards the primary inputs (PIs) and primary outputs (POs), causing bad internal latch-to-latch timing, over buffering, and poor layer assignment. Most of the time, designers are aware that the timing assertions may be bad and will need to be fixed later. Latches are typically placed via traditional wirelength-driven placement, and any problematic latches have to be identified and specifically fixed (re-placement, timing optimization, etc.). This approach creates a very unstable flow throughout the design stages, and is particularly unreliable when boundary timing is not trustworthy. The results are increased area, over-promotion, congestion, etc. Recovery is expensive, and the designer often may not be able to satisfy constraints on the boundary paths.

It would, therefore, be desirable to devise an improved method of satisfying boundary timing constraints which could be applied during the constructive placement phase(s) of physical synthesis. It would be further advantageous if the method could help stabilize the process flow with latch placement predictability. The present invention achieves these objects by placing certain latches and associated logic that are logically connected to a PI or PO closer to that PI or PO by way of various placement constraints, and then allow flexible boundary assertion adjustment, followed by timing-driven placement. The advantage of this approach is to give the maximum flexibility for boundary constraints and reduce the over buffering and layer assignment for boundary paths, while still focusing on internal latch-to-latch paths. The resulting methods can be used to solve timing-driven latch placement (and gate placement) to satisfy boundary timing constraints at all design stages.

Figure 2:
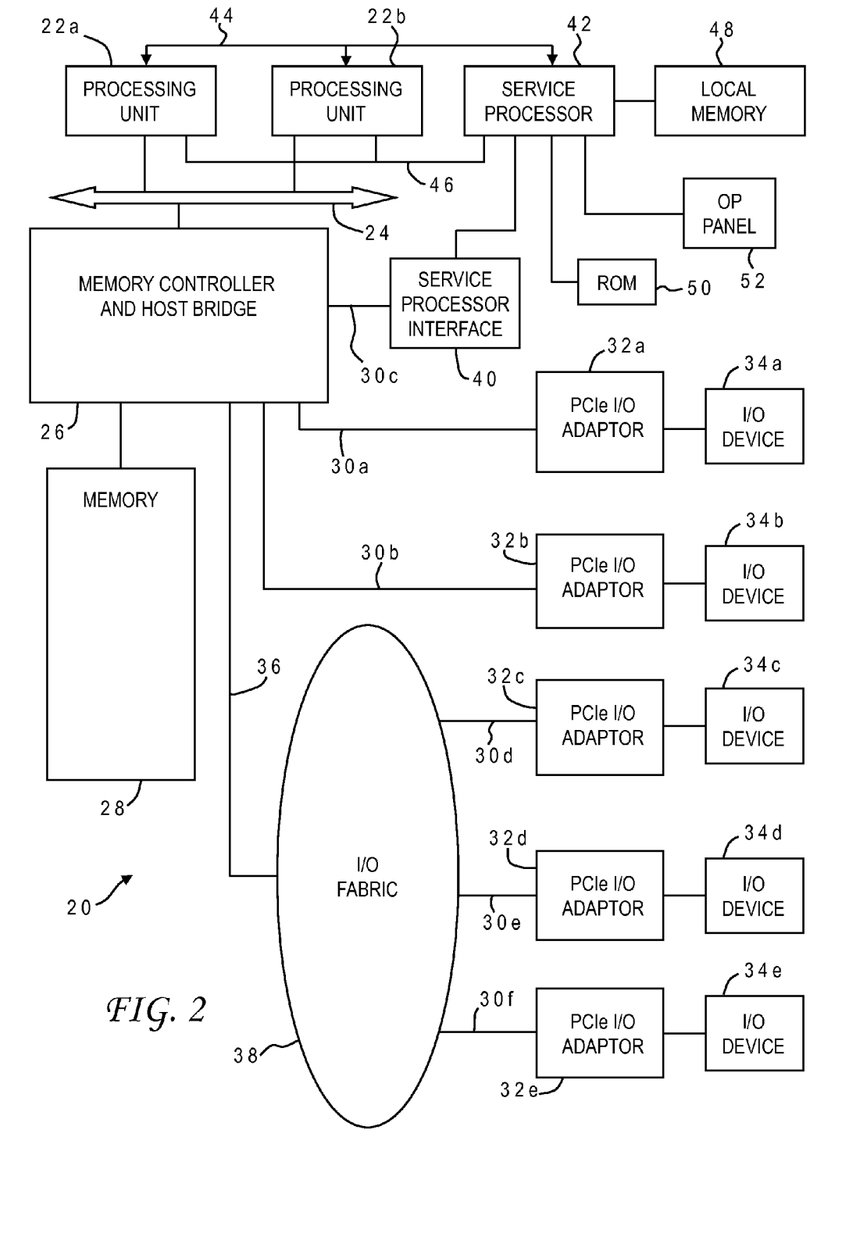
FIG. 2 is a block diagram of a computer system programmed to carry out integrated circuit design in accordance with one implementation of the present invention.

With reference now to the figures, and in particular with reference to FIG. 2, there is depicted one embodiment 20 of a computer system in which the present invention may be implemented to carry out the design of logic structures in an integrated circuit. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 26 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular the circuit design application of the present invention, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 20 carries out program instructions for a circuit design process that uses novel placement techniques to better manage boundary timing constraints. Accordingly, a program embodying the invention may include conventional aspects of various placement tools, and these details will become apparent to those skilled in the art upon reference to this disclosure.

Figure 3A:
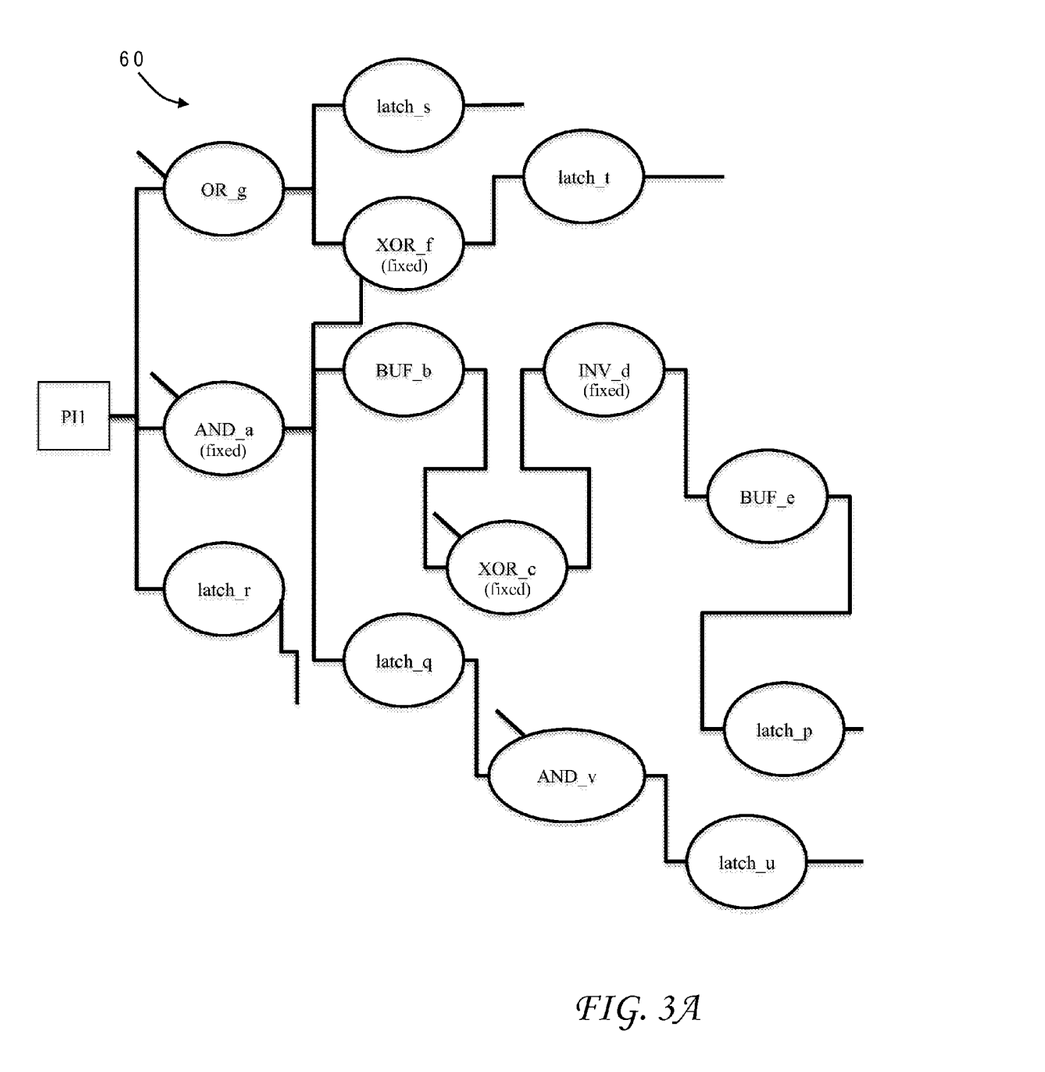
FIGS. 3A-3C show one example of a portion of a circuit having boundary logic gates and boundary latches which are subjected to various placement constraints in accordance with different implementations of the present invention.

In the illustrative implementation, computer system 20 is used to designate a subset of latches as boundary latches, apply placement constraints to the boundary latches, perform global placement using wirelength optimization while the boundary latch placement constraints are in place, and then change timing assertions for the circuit design and run a timing-driven placement. Different approaches may be used to identify the subset of latches in the circuit or sub-circuit that are to be considered as boundary latches. A boundary latch is generally the first latch found along any interconnection path to a PI/PO, although some latches can be filtered out as described further below. FIG. 3A illustrates one example of a portion of a circuit 60 having boundary logic gates and boundary latches which are to be subjected to placement constraints in accordance with one implementation of the present invention. Circuit 60 includes at least one primary input PI1, a plurality of logic gates such as AND gates, OR gates, XOR gates, inverters and buffers, and a plurality of latches connected to these logic gates or to the primary input. The PIs and POs are distinguished from other interconnection points of the circuit by the provision of an arrival time (AT) for a PI and a required arrival time (RAT) for a PO. Circuit 60 includes other inputs to the portion shown, such as those indicated by the extra input line for the combinational logic gates, and also extends further toward the PO(s) beyond the latches shown.

Candidate boundary latches may be initially identified by a depth-first search starting from the PI toward the PO along each interconnection path. In the example of FIG. 3A, the output of PI1 has three branches, the topmost connected to OR_g. OR_g has two output branches, one connected to latch_s, which is accordingly designated as a boundary latch. When the search hits a latch, computer system 20 does not trace further so further searching is performed beyond the output of latch_s. The other branch of OR_g is connected to XOR_f, which is a fixed gate in the given netlist. XOR_f has only one output connected to latch_t which is again designated as a boundary latch. The second branch from PI1 is connected to AND_a, another fixed gate, having three outputs connected to XOR_f, BUF_b and latch_q. The path down XOR_f has already been considered (a re-convergence) and does not need to be searched again. The output of BUF_b eventually leads to latch_p via intervening gates, XOR_c (fixed), INV_d (fixed) and BUF_e. Since latch_p is the first latch along this path from PI1, it is designated as a boundary latch, as is latch_q which is the last output of AND_a. Finally, the last branch from PI1 is directly connected to latch_r so it is also a boundary latch. For illustrative purposes, one downstream circuit section from the output of latch_q is shown which includes AND_v and latch_u. Since latch_u was not the first latch encountered along the path from PI1, it is not designated as a boundary latch.

Circuit 60 also has at least one primary output, not shown, and the foregoing discussion applies in the same manner to boundary logic gates and boundary latches connected proximate the primary output, i.e., the boundary latches are also found by doing a depth-first search tracing backward from the PO toward the PI.

Figure 3B:
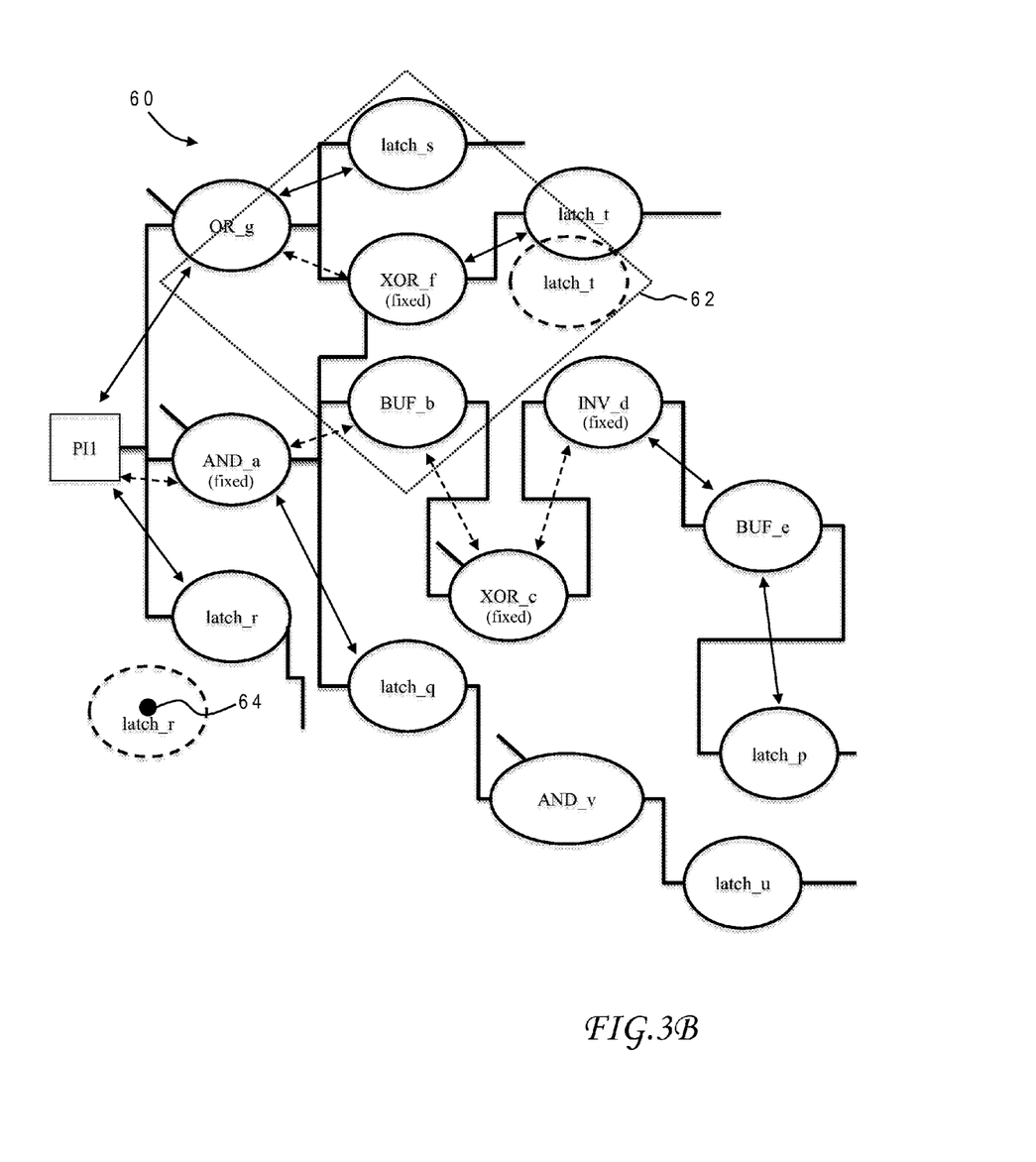

One of the placement constraints that can be applied to the boundary latches is an attraction (e.g., a weighting for the wirelength-based placer) between a given boundary latch and a gate along the path to the PI/PO (the PI and PO are also considered fixed). In the preferred implementation, attractions are applied between each interconnection point along the path from the boundary latch to its closest fixed gate. Thus, as indicated in FIG. 3B by the double-arrow solid lines, attractive forces can be applied between latch_s and OR_g as well as between OR_g and PI1 to affect the placement of latch_s. Similarly, attractive forces can be applied between latch_p and BUF_e as well as between BUF_e and INV_d to affect the placement of latch_p. Any boundary latch connected directly to a fixed gate will result in only one added attraction such as for latch_q, latch_r and latch_t.

In an alternative implementation, attractions are threaded along the entire path from the PI/PO to the boundary latch. Thus, in addition to the attractions listed in the foregoing paragraph, attractive forces can also be applied as indicated by the double-arrow dashed lines in FIG. 3B between INV_d and XOR_c, between XOR_c and BUF_b, between BUF_b and AND_a, and between AND_a and PI1 to affect the placement of latch_p. If there is a re-convergence (e.g., with XOR_f) preferably only one attraction is added, in this example between XOR_f and OR_g. These additional attractions can have the same weight as the boundary latch attractions or can be different. In an exemplary embodiment the attractions are implemented by applying a wirelength weight between the objects which is ten to fifty times the normal wirelength weight for the placer.

Other attractions may be applied to the boundary latches besides an attraction to a connected gate. For example, the boundary latch could be attracted to the center of a bounding box for the connected PIs/POs of the circuit, or a direct pin-to-pin attraction could be provided between the boundary latch and a PI or PO. Other placement constraints may be also applied to the boundary latches besides attractions. For example, a boundary latch may be pre-placed at a specific location as indicated in FIG. 3B at 64 to constrain the location of latch_r. The latch may be placed close to the PI/PO or the closest fixed object. Instead of fixing the latch at the indicated point, an attraction may be applied between that point and the latch. Alternatively (or additionally), a diamond or square movebounds centered around a constraining point may be defined for the boundary latch. FIG. 3B illustrates such a movebounds 62 for latch_t which is centered around the closest fixed gate, XOR_f. The size of the movebounds may vary greatly but is preferably based on timing, or a predefined value.

The foregoing constraints are non-timing driven, but the constraints may also by timing driven. For example, constraints may be set based on a PI arrival time or a PO required arrival time (translated to a maximum distance where a boundary latch can be placed), which can bias placement toward more critical PIs/POs. These distance thresholds can then be used to create movebounds and/or fix the latches to bound them within the pre-determined distance thresholds from the associated PIs/POs. The designer can provide input to rank the constraints based on criticality and discard conflicting constraints as appropriate.

Figure 3C:
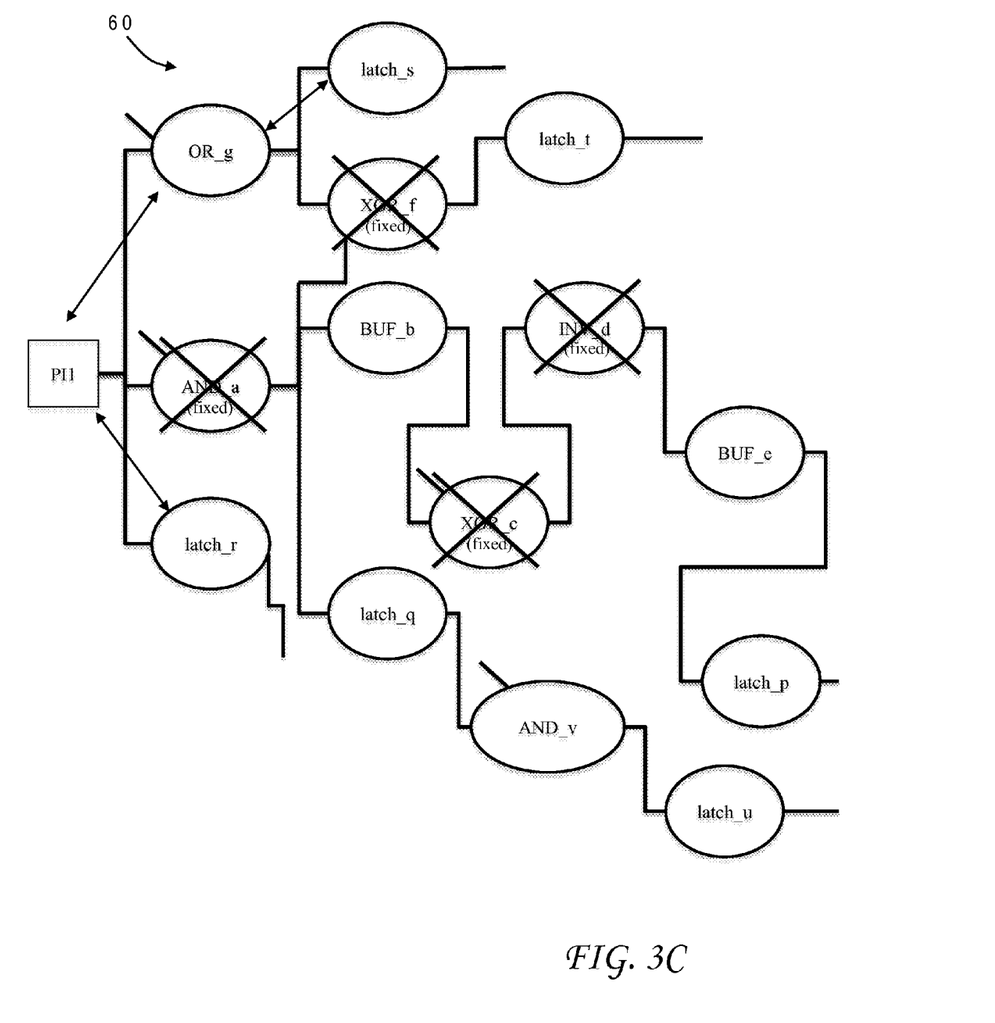
Figure 4:
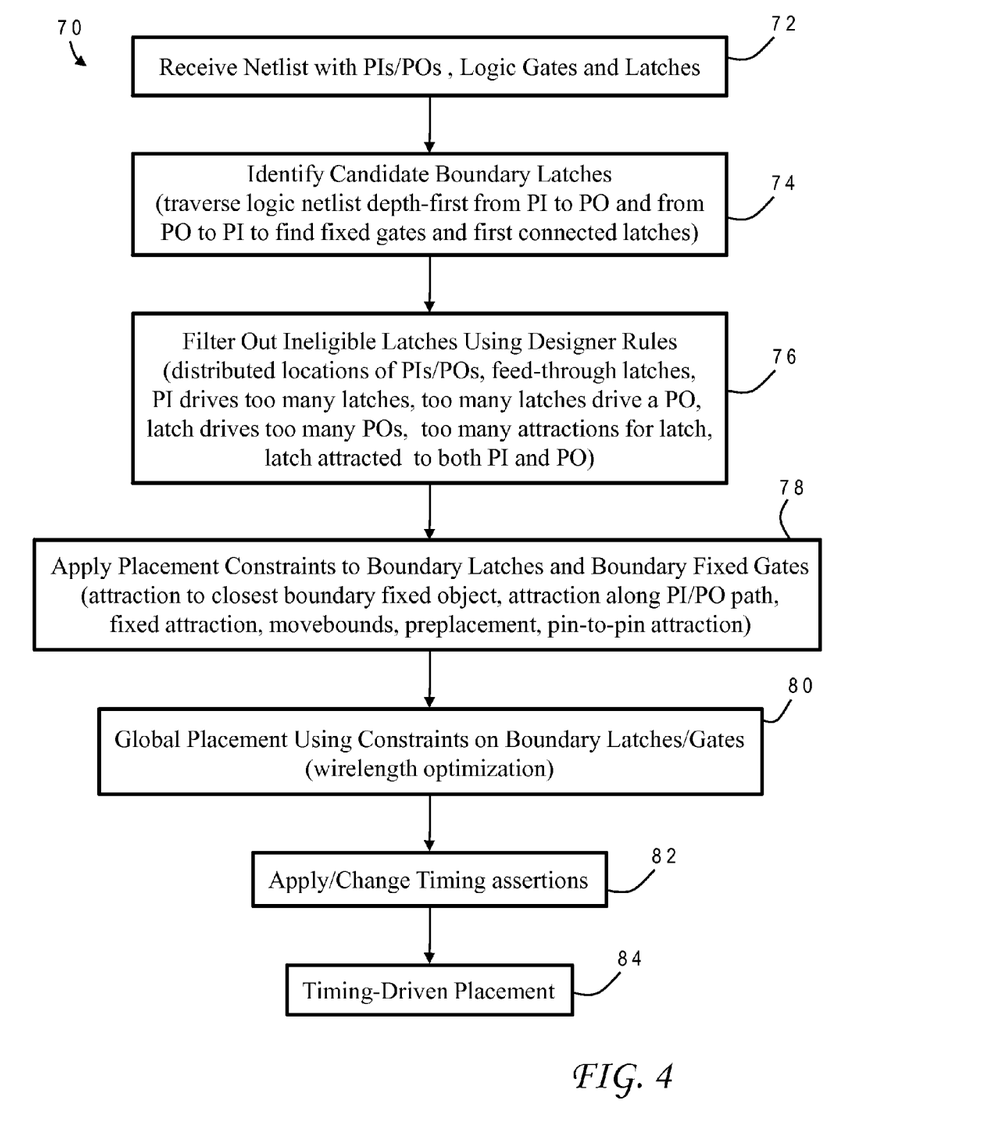
FIG. 4 is a chart illustrating the logical flow for a boundary latch and logic placement process in accordance with one implementation of the present invention.

As noted above, some candidate latches can be filtered out of the designated subset of boundary latches based on various rules. In one implementation, no attraction will be created for fixed gates, so when the depth-first search hits a fixed gate, no further tracing forward is performed. If this filter is applied to the example of FIG. 3A, then none of latch_t, latch_q or latch_p are designated as boundary latches. The result is seen in FIG. 3C with attractions only between latch_s and OR_g, OR_g and PI1, and latch_r and PI1. In a further implementation, no constraints are ever set for objects connected directly to a PI/PO.

There are many other types of filters which can be used by the designer independently or in combination to impart smartness to the boundary latch designation. For example, in some circuit designs the PIs/POs may have distributed locations, and latches connected to these distributed locations might be ignored. A bounding box of the PIs/POs can be used to detect such scenarios. Feed-through latches can also be ignored, i.e., latches that are connected directly to both a PI and a PO, or latches that would be attracted to both a PI and a PO even if not directly connected. A latch might be ignored if belongs to a cluster of too many latches (say, 5 or more) connected to a single PI/PO, if it drives too many POs, or if it would generally be attracted to more than a threshold number of objects.

The invention thereby provides a set of mechanisms to add a priori placement constraints to the boundary latches. Constraint generation may be performed without timing information during the early stages of the design, or may be performed using timing information once the design exhibits more stable assertions. In the early design flow designers often cannot trust boundary assertions, so it is advantageous to use non-timing based constraints. Later in the design flow assertions are more trustworthy and so the constraints may be timing based. For both cases, timing-driven placement transforms can be used to move latches and satisfy latch-to-latch (l2l) timing.

The invention may be further understood with reference to the chart of FIG. 5 which illustrates the logical flow for one implementation of a boundary latch and logic placement process 70. The process begins with computer system 20 receiving the netlist or other description for the circuit identifying the various circuit elements including the PIs/POs, logic gates and latches 72. Computer system 20 identifies candidate boundary latches in the circuit by traversing the netlist depth-first from PI to PO (and PO to PI) to find any fixed gates and the first latches on the interconnection path 74. The PIs/POs and boundary fixed gates together comprise boundary fixed objects or points. Candidate latches are filtered out if they are ineligible according to designer rules 76, such as the filters mentioned above. The remaining subset of latches in the design are now considered boundary latches for which placement will be constrained. Computer system 20 adds the placement constraints for the boundary latches (and boundary fixed gates) 78, such as attractions, movebounds, or preplacement. Global placement is then performed (e.g., wirelength optimization) while the boundary latch placement constraints are in force 80, which will generally result in the boundary latches being placed closer to the corresponding PIs/POs. Timing assertions are applied, or if they were already in place as part of an earlier synthesis iteration, they can be changed 82, for example based on user input regarding which PIs/POs have sufficient slack, and timing-driven placement is carried out 84. The boundary latches will not move from the boundary if the internal path is good. If internal path is bad, then the boundary latches will compensate by moving inwardly.

The tool can generate a report and feedback to designers regarding which PIs/POs need further adjustment, e.g., if a PI has −50 slack, then the designer needs to make further adjustments). Also, if a PI/PO has positive slack (larger than the slack threshold), the designer can adjust the assertion back to meet the slack threshold and relax top level assertions. This entire placement process 70 can be part of a larger physical synthesis tool, for example providing a novel placement routine which replaces the conventional placement step 4 seen in FIG. 1. As such it may be repeatedly used during different iterations of the synthesis process. Later optimization steps can move the boundary latches and gates towards other logics in the design. The present invention thereby imparts superior stability to synthesis flow with greater latch placement predictability, and is particularly useful in helping unit or top-level designers set appropriate boundary assertions.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, those skilled in the art will appreciate that circuit 60 shows a limited number of circuit components but the invention may be applied to an integrated circuit design having thousands or millions of gates and latches. Also, the circuit may have other types of components, e.g., fixed objects such as port affinity buffers connected to boundary latches. It is therefore contemplated that such modifications can be made without departing from the spirit or scope of the present invention as defined in the appended claims.

What is claimed is:

1. A method of laying out a circuit design for an integrated circuit comprising:
   receiving a description of the circuit design which includes a plurality of latches interconnected with at least one primary input and at least one primary output, by executing first instructions in a computer system;
   designating a subset of latches as boundary latches, by executing second instructions in the computer system;
   applying one or more placement constraints to the boundary latches, by executing third instructions in the computer system;
   performing global placement on the circuit design using wirelength optimization while maintaining the placement constraints applied to the boundary latches, by executing fourth instructions in the computer system;
   implementing timing assertions for the circuit design, by executing sixth instructions in the computer system; and
   running a timing driven placement on the circuit design subject to the timing assertions, by executing seventh instructions in the computer system.

2. The method of claim 1 wherein said designating includes:
   conducting a depth-first search of the circuit design description to identify a plurality of candidate latches that are first found along interconnection paths from the primary input or to the primary output; and
   filtering out any ineligible latches from the plurality of candidate latches according to designer rules.

3. The method of claim 2 wherein said filtering filters out any candidate latch which is part of a cluster of latches that are driven by the primary input or drive the primary output, the cluster having a number of latches that exceeds a predetermined threshold.

4. The method of claim 2 wherein said filtering filters out any candidate latch that is directly connected to both the primary input and the primary output.

5. The method of claim 2 wherein said filtering filters out any candidate latch that drives a plurality of primary outputs wherein a number of the primary outputs so driven exceeds a predetermined threshold.

6. The method of claim 1 wherein said one or more placement constraints includes movebounds for a selected one of the boundary latches.

7. The method of claim 1 wherein said one or more placement constraints includes fixing a selected one of the boundary latches at a predetermined location.

8. The method of claim 1 wherein said one or more placement constraints includes at least one attractive force applied between a selected one of the boundary latches and a boundary fixed object.

9. A computer system comprising:
one or more processors which process program instructions;
a memory device connected to said one or more processors; and
program instructions residing in said memory device for laying out a circuit design for an integrated circuit by receiving a description of the circuit design which includes a plurality of latches interconnected with at least one primary input and at least one primary output, designating a subset of latches as boundary latches, applying one or more placement constraints to the boundary latches, performing global placement on the circuit design using wirelength optimization while maintaining the placement constraints applied to the boundary latches, implementing timing assertions for the circuit design, and running a timing driven placement on the circuit design subject to the timing assertions.

10. The computer system of claim 9 wherein said program instructions designate the boundary latches by conducting a depth-first search of the circuit design description to identify a plurality of candidate latches that are first found along interconnection paths from the primary input or to the primary output, and filtering out any ineligible latches from the plurality of candidate latches according to designer rules.

11. The computer system of claim 10 wherein said program instructions filter out any candidate latch which is part of a cluster of latches that are driven by the primary input or drive the primary output, the cluster having a number of latches that exceeds a predetermined threshold.

12. The computer system of claim 10 wherein said program instructions filter out any candidate latch that is directly connected to both the primary input and the primary output.

13. The computer system of claim 10 wherein said program instructions filter out any candidate latch that drives a plurality of primary outputs wherein a number of the primary outputs so driven exceeds a predetermined threshold.

14. The computer system of claim 9 wherein the one or more placement constraints includes movebounds for a selected one of the boundary latches.

15. The computer system of claim 9 wherein the one or more placement constraints includes fixing a selected one of the boundary latches at a predetermined location.

16. The computer system of claim 9 wherein the one or more placement constraints includes at least one attractive force applied between a selected one of the boundary latches and a boundary fixed object.

17. A computer program product comprising:
a computer-readable storage medium; and
program instructions residing in said storage medium for laying out a circuit design for an integrated circuit by receiving a description of the circuit design which includes a plurality of latches interconnected with at least one primary input and at least one primary output, designating a subset of latches as boundary latches, applying one or more placement constraints to the boundary latches, performing global placement on the circuit design using wirelength optimization while maintaining the placement constraints applied to the boundary latches, implementing timing assertions for the circuit design, and running a timing driven placement on the circuit design subject to the timing assertions.

18. The computer program product of claim 17 wherein said program instructions designate the boundary latches by conducting a depth-first search of the circuit design description to identify a plurality of candidate latches that are first found along interconnection paths from the primary input or to the primary output, and filtering out any ineligible latches from the plurality of candidate latches according to designer rules.

19. The computer program product of claim 18 wherein said program instructions filter out any candidate latch which is part of a cluster of latches that are driven by the primary input or drive the primary output, the cluster having a number of latches that exceeds a predetermined threshold.

20. The computer program product of claim 18 wherein said program instructions filter out any candidate latch that is directly connected to both the primary input and the primary output.

21. The computer program product of claim 18 wherein said program instructions filter out any candidate latch that drives a plurality of primary outputs wherein a number of the primary outputs so driven exceeds a predetermined threshold.

22. The computer program product of claim 17 wherein the one or more placement constraints includes movebounds for a selected one of the boundary latches.

23. The computer program product of claim 17 wherein the one or more placement constraints includes fixing a selected one of the boundary latches at a predetermined location.

24. The computer program product of claim 17 wherein the one or more placement constraints includes at least one attractive force applied between a selected one of the boundary latches and a boundary fixed object.

* * * * *